Aug. 12, 1924.
C. A. GIBBS
1,504,949
ARMORED BODY FOR AUTOMOBILES, TRACTORS, CARS, AND LIKE VEHICLES
Original Filed June 10, 1922   2 Sheets-Sheet 1
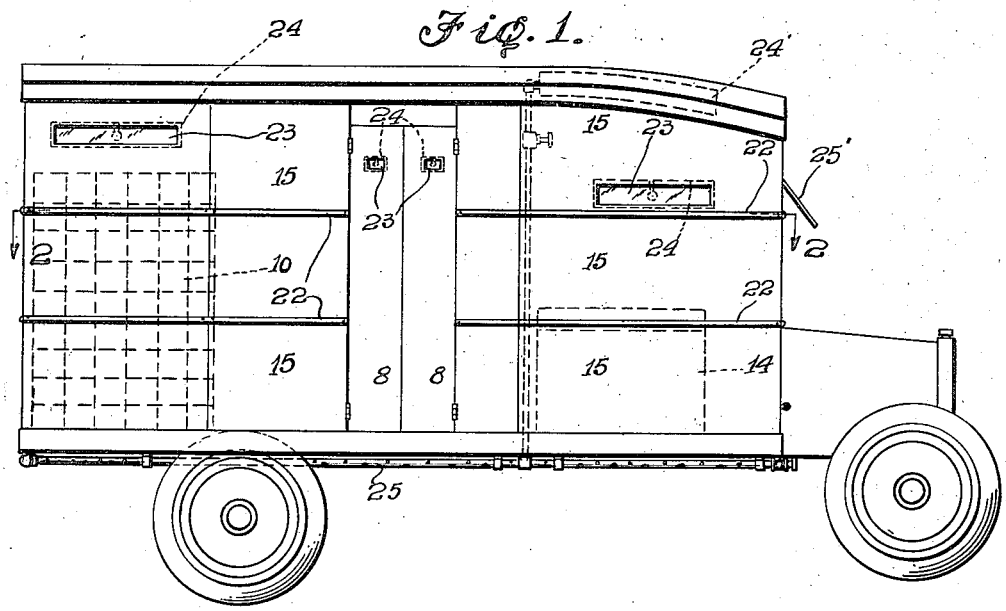
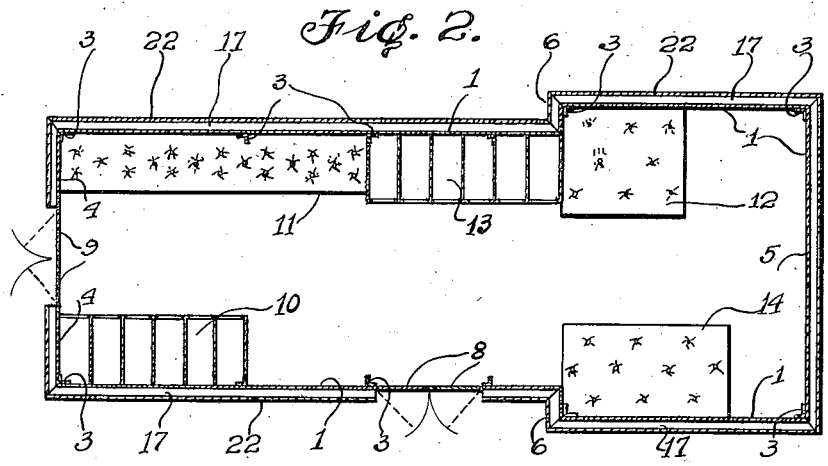
Inventor
C. A. Gibbs
By Jas. L. Skidmore
His Attorney.

Aug. 12, 1924.  
C. A. GIBBS  
1,504,949  
ARMORED BODY FOR AUTOMOBILES, TRACTORS, CARS, AND LIKE VEHICLES  
Original Filed June 10, 1922  2 Sheets-Sheet 2
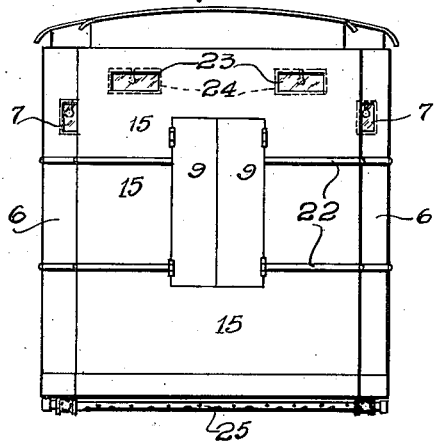
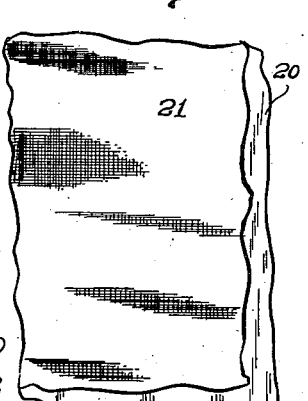
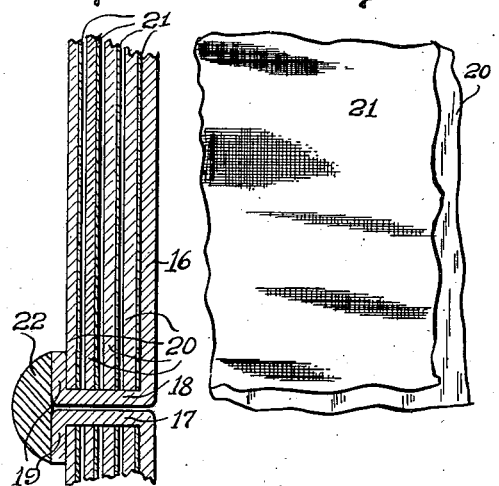
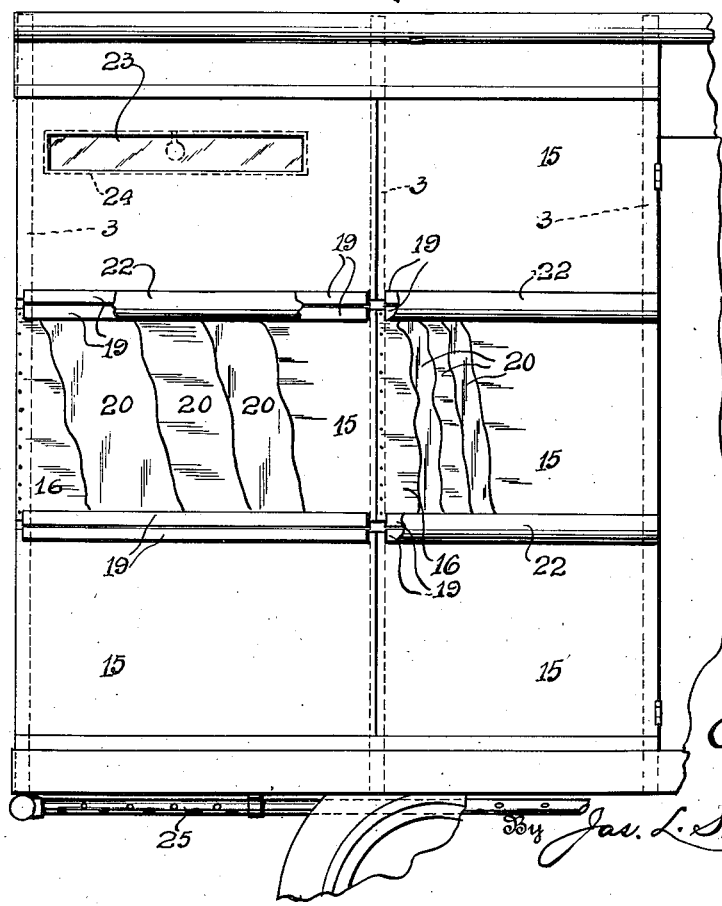
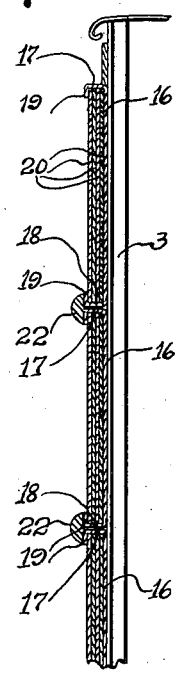
Inventor  
C. A. Gibbs  
By Jas. L. Skidmore  
his Attorney.

Patented Aug. 12, 1924.

1,504,949

UNITED STATES PATENT OFFICE.

CLARENCE A. GIBBS, OF HOBOKEN, NEW JERSEY.

ARMORED BODY FOR AUTOMOBILES, TRACTORS, CARS, AND LIKE VEHICLES.

Application filed June 10, 1922, Serial No. 567,257. Renewed January 5, 1924.

*To all whom it may concern:*

Be it known that I, CLARENCE A. GIBBS, a citizen of the United States, residing at Hoboken, in the county of Hudson and State of New Jersey, have invented certain new and useful Improvements in Armored Bodies for Automobiles, Tractors, Cars, and like Vehicles, of which the following is a specification.

This invention relates to new and novel armored bodies for automobiles, tractors, cars, and like vehicles.

The prime object of the invention is to provide a novel and improved portable self-propelled armored vehicle for the use of banks, safe deposit companies and other similar institutions, and is especially designed to insure safe and convenient transportation and conveyance of money, jewelry, bonds, securities and other valuables from one place to another, and to and from customers of the bank, or other similar institution.

Another object of the invention is to provide a vehicle body built of high carbon steel sheets or plates fixedly secured to a series of upright steel angle bars, said sheets or plates being covered upon their outer face with a plurality of sections or panels composed of a plurality of laminated thin sheets of a special quality of spring sheet steel absolutely bullet proof, with port holes or openings properly located and formed through the body for effective defense.

Another object of the invention is to so construct my novel vehicle body as to include gas tanks supported therein, said tanks being filled with tear, ammonia or other suitable gases under pressure, and connected with suitable discharging and distributing pipes surrounding the vehicle, to be readily operated when desired or required, and is especially adapted and used to subdue, crush or quell insurrections or riots wherever they may occur, since a few men can defend a vehicle of this type against a multitude.

A further object of this invention is to so construct the body that all port holes or sight openings are provided with bullet proof glass windows, each hole or window being provided with a suitable steel cover for protection of the occupants when in action, and a suitable sheet steel cover is arranged to protect the wind-shield at the front.

The foregoing and such other objects as may appear from the ensuing description are attained by the construction, arrangement, combination, assembling and location of the parts hereinafter more fully described, illustrated in the accompanying drawings, and particularly pointed out in the claims appended hereto, it being understood that slight changes in the precise form, proportions and minor details of the construction may be resorted to without departing from the spirit or sacrificing any of the advantages of the invention.

In the accompanying drawings which form a part of the specification it will be seen that:—

Figure 1 is a side elevation of the vehicle embodying my invention.

Figure 2 is a longitudinal section taken in the plane of the dotted lines 2—2, Fig. 1, looking in the direction of the arrows.

Figure 3 is a rear end elevation.

Figure 4 is an enlarged side elevation of a portion of the vehicle, showing the body and rear wheel broken away, and a portion of the body armor sections broken away.

Figure 5 is an enlarged vertical section of the laminated armor sections for protecting the body, showing the lowermost section broken away.

Figure 6 is an enlarged rear side elevation of a portion of one of the armor sections, shown broken away and with a sheet of fabric secured to one of the spring steel armor sheets, and Figure 7 is an enlarged vertical section of a plurality of the sheets of fabric and steel forming each armor section or panel, each sheet being shown broken away.

Similar numerals of reference are used to designate like parts throughout the several views of the drawings.

In the embodiment of my invention as illustrated the numerals 1, 1, indicate the inner wall of each side of my improved vehicle body, said walls being preferably formed of a high carbon sheet steel and fixedly secured to the series of upright angle steel bars 3. The numeral 4 designates the inner sheet steel wall forming the rear end, and 5 is the inner sheet steel wall forming the front end of the body. Intermediate the length of the body it is provided with an inward lateral extension 6 at each side thereof, having formed in each extension a port hole or sight opening 7, whereby an occupant of the vehicle can readily discern the approach of any one at either side of the vehicle or toward the rear thereof, and at one side of the vehicle is suitably secured the inlet and exit doors 8, while the rear wall is formed with the doors 9 suitably secured to said wall for the passage of valuables therethrough in loading and unloading.

Fixedly and suitably secured within the body at and near the rear end thereof is a series of safety deposit boxes 10 arranged against the upright inner wall, and fixed to the inner wall at the opposite side of said body is a suitably constructed safety vault or strong box 11 preferably upholstered upon its upper surface thereby forming a seat or rest for one or more of the occupants, and between said vault 11 and a driver's seat 12 is fixedly secured against the upright inner wall another series of safe deposit boxes 13, similar to the boxes 10, while directly opposite the seat 12 is secured another safety vault or strong box 14 constructed and secured to the inner wall in any suitable or desirable manner.

It will be perceived that each side wall as well as the front and rear walls of my vehicle body is substantially covered on their outer side with a series of armored sections or panels 15, each of said sections or panels consisting of a metal rear plate or frame 16 preferably of iron formed with an outwardly extended top portion 17, and an outwardly extended bottom portion 18 running substantially the entire length of the plate, each of said extended portions terminating with a slightly inwardly extended portion 19, each of said plates being riveted to, or otherwise fixedly secured to the upright angle steel bars 3, and each of said plates is adapted to carry and support a plurality of thin sheets 20, formed of a special quality of spring steel, each metal sheet being provided with a sheet of fabric 21 cemented to its rear face and each of these combined sheets of metal and fabric are slidingly pushed into one end of the plate 16 and so arranged between the top and bottom of each plate as to leave a slight air space between each combined sheet to form an air cushion, as clearly shown in Fig. 7, the meeting sides of the plates 16 forming said sections or panels 15 being covered by a steel molding 22 suitably secured to the vehicle body.

It will be understood that a plurality of these combined sheets of metal and fabric are loosely and removably supported within the plate 16, so that should one of said sheets become damaged, a new sheet can be readily inserted by sliding out the damaged sheet and sliding in a new sheet to replace the one removed, and it will be readily obvious that the said armoured sections or panels not only serve to furnish an efficient and bullet proof vehicle body, but also impart to said body a somewhat ornamental, attractive and pleasing appearance.

Each of the port holes or openings 23 formed through the body and doors is preferably provided with bullet proof glass with a suitable steel plate shutter or drop 24, shown by dotted lines, to cover when in action, and the wind-shield at the front is provided with a suitable sheet steel cover 25'.

Suitably supported within the body is one or more gas tanks 24', each as shown by dotted lines Fig. 1 at the top portion thereof, each tank being filled with tear, ammonia, or other suitable gas, under pressure, and connected by suitable piping leading from the tank to the perforated distributing pipes 25 which surrounds the body and are secured thereto at the bottom portion thereof, said connected piping being provided with conveniently arranged controlling valves which may be readily and easily manipulated by the driver or other occupant, so that in the event that an attack is made on the vehicle at close range, the gas can quickly and effectively be distributed on all sides, or any one side or end of the vehicle, and thus successfully dispel or subdue the attack.

The bank safe vehicle such as shown and described may also be used by the banks for safety transporting bullion from one place to another and for transporting valuable documents, payrolls, bonds, etc., and the vehicle may also be used by safe deposit companies and other institutions for the safe transport and conveyance of jewelry, books and other valuables from the customer's place to the institution and vice versa, since the chauffeur and other occupants of the vehicle are effectively protected within the armored and bullet proof body of the vehicle and are provided with the desired equipments which constitute an efficient and safe defense from all of the customary attacks.

It will be seen that my improved vehicle body is provided with all of the necessary and desirable equipments for the safe conveyance of valuables of various kinds, at the same time leaving sufficient unobstructed space for movement therein and seating accommodation for the desired or required number of occupants thereof.

While I have not shown the side and rear end doors as being provided with the armored bullet proof panels herein described, it will be readily apparent that such panels may be arranged over the outer face of said doors, thereby rendering the armored protection of the vehicle body more thorough and complete.

Having thus described my invention what I claim and desire to secure by Letters Patent is:—

1. An armored vehicle body of the character described, comprising an inner steel frame having its outer side and end surfaces covered with a plurality of horizontally disposed bullet proof panels fixedly secured to said frame, and a plurality of moldings adapted to cover the meeting edges of said panels.

2. An armored vehicle body of the character described, comprising an inner steel frame formed of steel sheets and upright steel angle bars, a plurality of bullet proof panels fixedly secured to the outer face of the sides and ends of said frame, and a plurality of moldings adapted to cover the meeting edges of said panels.

3. An armored vehicle body of the character described, comprising an inner steel frame formed of steel sheets fixedly secured to a plurality of upright steel angle bars, and a plurality of bullet proof panels rigidly secured to the outer face of the sides and ends of said frame, each of said panels being formed of a plurality of thin sheets of a special quality of spring steel.

4. An armored vehicle body of the character described, comprising an inner steel frame having its outer side and end surfaces covered with a plurality of bullet proof panels fixedly secured to said frame, each of said panels being formed of a plurality of thin sheets of a special quality of spring steel carried by a metal frame, and a sheet fabric backing cemented to each of said sheets.

5. An armored vehicle body of the character described, comprising an inner steel frame, and a plurality of bullet proof panels fixedly secured to the outer face of the sides and ends of said frame, each panel consisting of an iron frame adapted to support a plurality of thin spring steel sheets, each sheet having a backing of fabric secured thereto, and disposed within said iron frame so as to leave an air space forming an air cushion between each sheet.

6. An armored vehicle body of the character described, comprising an inner steel frame, and a plurality of bullet proof panels fixedly secured to the outer face of the sides and ends of said frame, each panel being composed of an iron frame formed with an outwardly and inwardly extended portion at each side adapted to support a plurality of thin spring steel sheets arranged in parallel relation with each other, each sheet having a backing of fabric secured thereto and so disposed within said iron frame as to leave an air space between each sheet and to be independently removable.

7. An armored vehicle body of the character described, comprising an inner steel frame, and a plurality of bullet proof panels fixedly secured to the outer face of the sides and ends of said frame, each panel consisting of an iron frame adapted to carry a plurality of loosely and removably disposed sheets of spring steel, each sheet having a fabric backing secured thereto, and arranged parallel to each other within said inner frame so as to leave an air space forming an air cushion between each sheet.

8. In a structure of the character described, an inner steel frame forming a body, a plurality of bullet proof panels fixedly secured to the outer face of said body, a safety vault secured to the front side portion and a safety vault secured to the rear side portion within the body, a seat for the driver, a series of deposit boxes disposed between the driver's seat and rear vault, and a series of deposit boxes disposed opposite said rear vault.

9. In a structure of the character described, an inner steel frame forming a body, a mutiplicity of bullet proof panels fixedly secured to the outer face of said body, a safety vault fixedly secured to the front side portion and a safety vault secured to the opposite rear side portion of the body, a seat for the driver, a series of deposit boxes fixedly secured to said frame between the driver's seat and rear vault, a series of deposit boxes secured opposite said rear vault, and seats formed on the top of each of said vaults for the attendants.

10. In a structure of the character described, an inner steel frame forming a body, a multiplicity of bullet proof panels fixedly secured to the outer face of said body, safety vaults disposed at the front and at the rear portion of the body adapted to form seats for the attendants, a driver's seat, a series of deposit boxes disposed between the driver's seat and rear vault, a series of deposit boxes secured opposite to said rear vault, and steel molding strips secured over the meeting sides of said panels.

11. An armored vehicle body of the character described, comprising an inner steel frame, a gas tank suitably supported within said frame, gas distributing means secured to the bottom of said frame at the sides and ends thereof, and means connecting said tank with the distributing means.

12. An armored vehicle body of the character described, comprising an inner steel frame, a plurality of bullet proof panels rigidly secured to the outer face of said frame, a gas tank supported within said frame, gas discharging means secured to said frame at the sides and ends thereof, and means connecting said tank with the discharging means.

13. An armored vehicle body of the character described, comprising an inner steel frame formed with an inward extension intermediate its length at each side thereof, and a port hole formed through each extension to permit an attendant to guard the rear sides and end of the vehicle.

14. An armored vehicle body of the character described, comprising an inner steel frame formed with an inward extension intermediate its length at each side thereof, a plurality of horizontally disposed bullet proof panels fixedly secured to the outer face of said frame, and a port hole formed in each of said extensions to permit the attendants to guard the rear sides and end of the vehicle from attack.

15. In a structure of the character described, an inner steel frame forming a body, a multiplicity of bullet proof panels fixedly secured to the outer face of said body, a safety vault secured at each side of the body, a series of deposit boxes secured at opposite sides of the body, doors secured at one side of the body, doors secured to the rear end of said body, bullet proof glass windows secured within each of said doors and within each side of the body, and steel shutters for each of said windows adapted to cover the same when in action.

CLARENCE A. GIBBS.